United States Patent [19]

Murphy

[11] Patent Number: 4,666,588

[45] Date of Patent: May 19, 1987

[54] THREE-PHASE REACTOR DESIGN AND OPERATION

[75] Inventor: James R. Murphy, Allentown, Pa.

[73] Assignee: Air Products and Chemicals, Inc., Allentown, Pa.

[21] Appl. No.: 746,604

[22] Filed: Jun. 19, 1985

[51] Int. Cl.[4] ............................................. C10G 23/06
[52] U.S. Cl. ............................. 208/251 H; 208/108; 208/157
[58] Field of Search ................... 208/251 H, 153, 157, 208/108

[56] References Cited

U.S. PATENT DOCUMENTS

| | | | |
|---|---|---|---|
| 2,875,150 | 2/1959 | Schuman | 208/157 |
| 2,943,040 | 6/1960 | Weisz | 208/251 |
| 3,041,273 | 6/1962 | Smith et al. | 208/153 |
| 3,249,528 | 5/1966 | Allred | 208/3 |
| 3,708,420 | 1/1972 | Irvine | 208/251 H |
| 3,835,029 | 9/1974 | Larson | 208/153 |
| 3,870,623 | 3/1975 | Johnson et al. | 208/251 H |
| 3,901,660 | 8/1975 | Ohorodnik et al. | 208/157 |
| 3,964,995 | 6/1976 | Wolk et al. | 208/251 H |
| 4,048,057 | 9/1977 | Murphy | 208/89 |
| 4,082,648 | 4/1978 | Murphy | 208/97 |
| 4,287,088 | 9/1981 | Sirkar | 208/251 H |
| 4,345,992 | 8/1982 | Washer et al. | 208/153 |
| 4,389,301 | 6/1983 | Dahlberg et al. | 208/157 |
| 4,437,979 | 3/1984 | Woebcke et al. | 208/153 |

FOREIGN PATENT DOCUMENTS 328649  5/1930  United Kingdom ................ 208/157

OTHER PUBLICATIONS

Catalytic Cracking Marshall Sitlig, a Gulf Publishing Co. Publication 11/50, pp. 125-127.

Primary Examiner—Glenn Caldarola
Attorney, Agent, or Firm—Mark L. Rodgers; E. Eugene Innis; James C. Simmons

[57] ABSTRACT

The present invention provides for an improved three-phase reactor design and method of operation. A liquid feed/catalyst slurry is mixed with a hydrogen-containing gas stream in an external mixing loop in fluid communication with a vertically oriented reaction vessel. The hydrogen-enriched slurry is subsequently passed downwardly through the reaction vessel where the liquid feed is reacted with the hydrogen to form a usable product.

15 Claims, 1 Drawing Figure

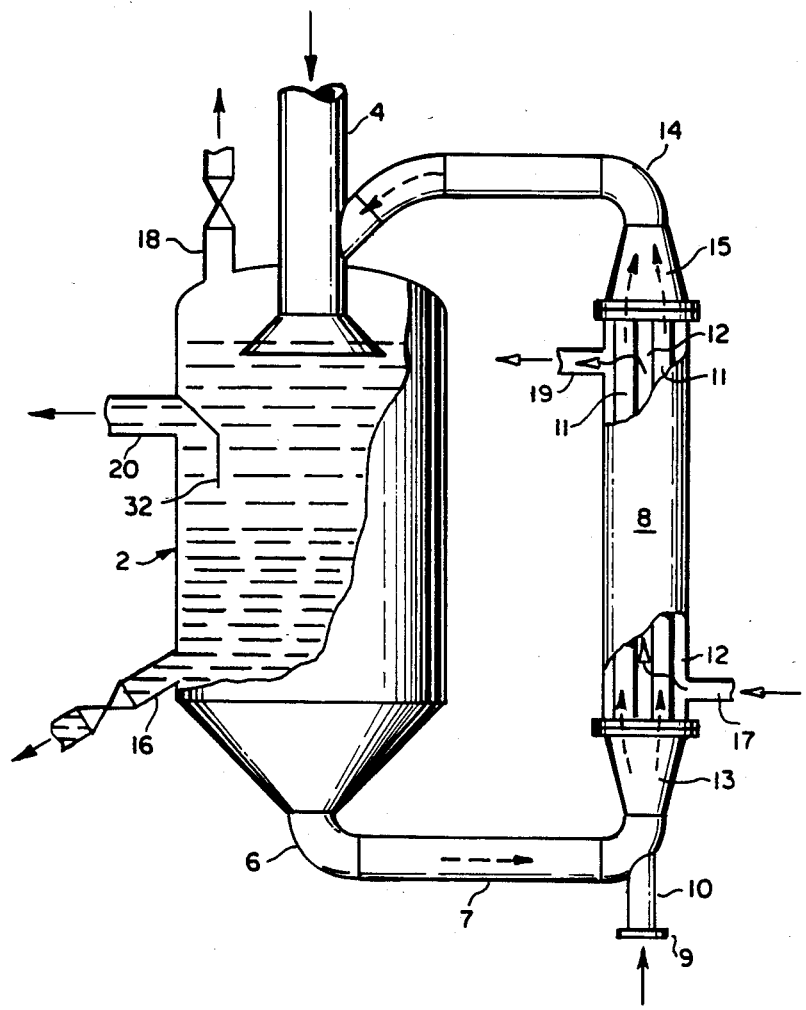

THREE-PHASE REACTOR DESIGN AND OPERATION

TECHNICAL FIELD OF THE INVENTION

The present invention relates to an improved three-phase reactor design and method of operation. It particularly involves the use of the improved reactor design in hydrotreating operations.

BACKGROUND OF THE INVENTION

Three-phase reactors, such as typical ebbulating bed reactors, are employed in a wide variety of catalytic, hydrotreating operations. One such operation is the hydrotreatment of poor quality residual oil to obtain usable liquid products. In this type of process, relatively large cataylst pellets are suspended in the viscous residual oil and hydrogen is introduced in excess into the bottom of the reaction vessel. The feed oil and catalysts flow upward through the reactor along with the hydrogen during the reaction.

Two essentially different types of reactions occur in such a hydrotreatment operation. First, asphaltenes, which contain a large portion of the metals, sulfur and nitrogen, are decomposed by the catalyst and agglomerate forming coke. Second, oils and resins present in the feedstock are converted to naptha and middle distillates through a largely thermal hydrocracking process.

Examples of processes for hydrotreating Atmospheric Tower Bottom residual oils are disclosed in U.S. Pat. Nos. 4,048,057 and 4,082,648. In both of these processes, the feedstock, mixed with hydrogen, contacts a cracking catalyst in a conventional moving bed reactor with a closed loop catalyst circulation system at mild hydrocracking conditions; e.g. a temperature of from about 400° C. to about 450° C. and a hydrogen partial pressure from about 700 psig to 3000 psig. The effluent from the reactor is subsequently cooled causing a solid asphaltic fraction to precipitate. Once precipitated, the asphaltic fraction can be removed by simple filtration or other conventional means to provide a higher quality treated feedstock for subsequent refining processes.

Conventional reactor systems employed in these processes suffer from a number of disadvantages. For example, relatively large catalyst pellets which are employed in this type of reactor provide a relatively small surface on which asphaltenes may be deposited. The asphaltenes, therefore, tend to migrate to relatively stagnant areas of the reactor where they agglomerate and form coke deposits. These coke deposits must subsequently be removed from the reactor. Additionally, the flow of gaseous hydrogen through the highly viscous fluid or slurry tends to be as large bubbles which provide little area for the mass transfer of hydrogen and products. The large amount of hydrogen which must be circulated carries off most of the more volatile and fluid components, leaving only a highly viscous residue in the reactor. A large hydrogen recovery system and recycle loop is also required.

BRIEF SUMMARY OF THE INVENTION

The present invention is a three-phase reactor design and process for using the reactor to hydrotreat a liquid, hydrocarbon-containing feedstock. In the present process, the liquid, hydrocarbon-containing feedstock is initially mixed with catalyst to form a liquid feed/catalyst slurry which is introduced into a reaction vessel through a feed inlet located near the top of the vessel. At least a portion of the liquid feed/catalyst slurry is removed from the bottom portion of the reaction vessel and passed through an external mixing loop in fluid communication with the vessel. A hydrogen-containing gas stream is introduced into the external mixing loop where it mixes with the liquid feed/catalyst slurry. The hydrogen-containing liquid feed/catalyst slurry is subsequently introduced back into the upper portion of the reaction vessel.

In the upper portion of the reaction vessel, the hydrogen-containing liquid feed/catalyst slurry combines with fresh slurry entering the reaction vessel. The feed is hydrotreated as the combined slurry travels downwardly through the reaction vessel. Liquid product of the hydrotreatment is withdrawn through a fluid outlet while the unreacted feed and catalyst are returned to the external mixing loop for admixing with additional hydrogen-containing gas.

In a preferred embodiment, the liquid feed/catalyst slurry mixing with the hydrogen-containing gas in the external mixing loop is indirectly contacted with a heat exchange medium to regulate the temperature of the hydrogen-containing liquid feed/catalyst slurry so that it leaves the external mixing loop at a temperature suitable for the particular reaction taking place within the reaction vessel.

BRIEF DESCRIPTION OF THE DRAWING

The single FIGURE of the drawing is a elevational view of the apparatus of the present invention with portions broken away to reveal details thereof.

DETAILED DESCRIPTION OF THE INVENTION

The present invention is a three-phase reactor design and a process for using the reactor to hydrotreat a hydrocarbon-containing feedstock. One embodiment of the present invention involves hydrodemetallization of Atmospheric or Vacuum Tower Bottom residual oil; i.e., reduced crudes. Hydrodemetallization is a process for pretreating poor quality reduced crudes to remove heavy metals prior to undergoing catalytic hydrocracking.

Referring to the accompanying figure, Atmospheric or Vacuum Tower Bottom residual oil feedstock is mixed with the required catalyst to form a liquid feed/catalyst slurry which is introduced into a vertically oriented reaction vessel 2 through a feed inlet 4. The slurry entering the reaction vessel 2 typically contains about 2.5 weight % catalyst, with the remainder being reduced crude. The catalyst mixed with the feedstock should have a very small particle size and high surface area. Catalyst particle sizes between 20-300 microns are preferred. Non-pelletized spent Fluidized Catalytic Cracking (FCC) or Heavy Oil Cracking (HOC) catalyst or ground used Hydrodesulfurization (HDS) catalyst, are well suited for this process. The liquid feed/catalyst slurry is withdrawn from the reaction vessel 2 through a fluid outlet 6 and is subsequently passed through an external mixing loop 8 in fluid communication with the reaction vessel 2 via inlet conduit 7 and outlet conduit 14. External mixing loop 8 includes mixing tubes 11 which are in fluid tight communication through suitable transition sections 13, 15 with inlet conduit 7 and outlet conduit 14 respectively. A hydrogen-containing gas stream is introduced into the mixing tubes 11 through a gas inlet 9 connected via a conduit 10 to the bottom of the external mixing loop 8. The hydrogen-containing gas is mixed with the liquid feed/catalyst slurry in a high velocity upward flow which promotes mass transfer and small bubbles; e.g. about 1 mm diameter, of gas in liquid. Residence time of the liquid slurry in the external mixing loop 8 should be sufficient to allow for complete saturation of liquid with hydrogen; i.e., typically about two seconds. The quantity of hydrogen added to the external mixing loop 8 should be sufficient to maintain the hydrotreating reactions occurring in the reaction vessel.

A heat exchange medium, such as steam, is passed through heat exchange passages 12 via inlet 17 and outlet 19 in close proximity to the mixing tubes 11. The heat exchange medium can either add or remove heat to the liquid feed/catalyst slurry passing through the external mixing loop 8, depending upon the required reaction conditions in the reaction vessel 2. For example, the temperatures required to achieve appreciable thermal hydrocracking are comparatively high to those used in residue hydrodesulfurization processes. It is particularly difficult to provide the necessary heat in furnaces without experiencing extensive coking and short furnace runs. In this reactor system, relatively mild temperatures are used to heat the feedstocks in the furnace. The required heat for raising feed to reaction temperature and providing the heat of reaction is realized through the hydrogen-saturated recirculation stream. This stream in turn receives its heat through the heat exchange medium being circulated in the heat exchange passageways 12. A temperature range between 400°–450° C. and a pressure between 30–70 atm is preferred for typical hydrodemetallization operations.

The hydrogen saturated, liquid feed/catalyst slurry is withdrawn from the external mixing loop 8 through outlet 14 in fluid communication with the upper portion of the reaction vessel 2. Preferably, the outlet 14 of the external mixing loop 8, connects directly to the feed inlet 4 of vessel 2 such that the liquid feed/catalyst slurry leaving the external mixing loop 8, mixes with the fresh feed and catalyst before entering reaction vessel 2. As the combined slurry travels downwardly through the reaction vessel 2, conditions such as temperature and space velocity are regulated to promote cracking of the metal-containing compounds. The small catalyst particle size provides sufficient surface area for both the metals and asphaltenes to attach to the catalyst particles. Asphaltene removal in this manner prevents the formation of coke deposits within the reaction vessel and also limits hydrogen consumption since the asphaltenes are removed on the catalyst as product instead of converted to an oil. Therefore, hydrogen is used primarily to convert only oils and resins to form a clear oil product, requiring relatively mild conditions and low hydrogen consumption. The conversion of the residual crude to naptha and middle distillates is largely a thermal hydrocracking process, with the catalyst being used primarily to remove contaminants such as metals, sulfur, nitrogen and asphaltenes, from the unconverted residual oil.

Spent catalyst containing metals, asphaltenes and other contaminants are continuously removed from the reaction vessel 2 through a spent catalyst slurry outlet 16 at a rate about equal to that of catalyst entering the reactor with the feed. During the process, the catalyst concentration within the reaction vessel 2, is maintained at about 20–40 wt.%. Vapor, which contains a large percentage of converted product is removed from the top of the reactor through a vapor product outlet 18. The clear liquid oil product is removed from the reaction vessel 2 through a liquid product outlet 20, at a rate required to control the reactor liquid level. A baffle device 32 is positioned inside the reaction vessel 2 to prevent unreacted slurry traveling downward through the reaction vessel 2 from leaving the vessel 2 with the clear liquid product through the product outlet 20.

Spent catalyst removed from the reaction vessel with asphaltenes and some liquid is sent to a naptha wash wherein the heavy oil and asphaltenes are removed from the catalyst. The washed catalyst can be regenerated by steam stripping followed by carbon burnoff at carefully controlled conditions. Alternatively, the washed catalyst can be treated with oxygen to produce a hydrogen-CO gas by partial oxidation, or a similar process. The hydrogen produced can subsequently be used as a hydrogen containing gas feed added to the liquid feed/catalyst slurry passing through the external mixing loop, thus making the present process self-sufficient in hydrogen supply.

The present invention accomplished a desired residual oil pretreatment using hydrogen at low pressure; i.e. less than about 70 atm, and employing a readily available catalyst. Prior hydrogen pretreatment processes use very high pressure (140–210 atm) in an upflow reactor to minimize coke formation and catalyst deactivation. As a result, reactors, compressors and pumps make these processes inefficient and expensive. The reactor design of the present invention allows for the use of small catalyst particles in a downflow operation. The vaporization of liquid is minimized so that the catalyst is retained in a relatively low density-low viscosity liquid oil, thereby avoiding the problems that occur in processes where the catalyst must reside in a heavy viscous oil. This is especially advantageous in treating heavy Vacuum Tower Bottom residual oil which could not be effectively treated using the other processes.

EXAMPLE 1

The reactor design and process described are used in a pilot plant operation in Heavy Arabian Vacuum Tower Bottom feedstock. The feedstock is slurried with about 2.5 wt% of typical FCC catalyst. The slurry is then pumped into the upper regions of a downflow reactor and mixed with a recycle stream saturated with hydrogen. Reactor conditions include a temperature of about 450° C., a pressure of about 1,000 psig and a space velocity of about 0.5 LHSV. The liquid products are separated from the catalyst and analyzed.

Typically, about 85% of the nickel, more than 90% of the vanadium, and 60% of the asphaltenes are deposited on the catalyst and, thus, are not present in the liquid product. In addition, about 15+% naphtha and 40% middle distillate are produced by thermal hydrocracking. The heavy fraction has metals and carbon residue contents sufficiently low so that this fraction could be combined with the atmospheric and vacuum gas oils from the crude still and charged to a Heavy Oil Cracking process.

While the above discussion and example uses the improved reactor design for hydrodemetallization, it can be used in any three-phase reaction wherein the use of small particle size catalyst has an advantage.

Hafing thus described the present invention, what is now deemed appropriate for Letters Patent is set out in the following appended claims.

What is claimed is:

1. A process for hydrotreating a liquid hydrocarbon-containing feedstock which comprises:
   (a) mixing said feedstock with a catalyst to form a liquid feed/catalyst slurry;
   (b) introducing said liquid feed/catalyst slurry into a reaction vessel through a feed inlet;
   (c) removing at least a portion of said liquid feed/catalyst slurry from the reaction vessel and passing it through an external mixing loop in fluid communication with the reaction vessel;
   (d) introducing a hydrogen-containing gas into the external mixing loop to mix with the liquid feed/catalyst slurry; and
   (e) introducing said hydrogen-containing liquid feed/catalyst slurry back into the upper portion of the reaction vessel.

2. The process in accordance with claim 1 wherein the catalyst has particle sizes ranging between 20–300 microns.

3. The process in accordance with claim 2 wherein the catalyst is selected from the group consisting of spent FCC catalyst, spent HOC catalyst and used HDS catalyst.

4. The process in accordance with claim 3 wherein the hydrogen introduced into the external mixing loop is introduced as small bubbles in a quantity sufficient to maintain the hydrotreating reactions occurring in the reaction vessel.

5. The process in accordance with claim 4 wherein a heat exchange medium is passed through a conduit in a close proximity to the external mixing loop to control the temperature of the slurry within the loop.

6. The process in accordance with claim 5 wherein said heat exchange medium is steam.

7. The process in accordance with claim 6 wherein said liquid hydrocarbon-containing feedstock is Vacuum Tower Bottom residual oil.

8. The process in accordance with claim 7 wherein the hydrotreatment operation is hydrodemetallization.

9. The process in accordance with claim 8 wherein the hydrotreatment operation also includes thermal hydrocracking.

10. The process in accordance with claim 9 wherein the reaction temperature in the reaction vessel is between 400°–450° C.

11. The process in accordance with claim 10 wherein the pressure within the reaction vessel is between 35–70 atm.

12. The process in accordance with claim 11 wherein the hydrogen-containing liquid feed/catalyst slurry introduced into the upper portion of the reaction vessel reacts to form a clear liquid product as it flows downward through the vessel.

13. The process in accordance with claim 12 wherein the clear liquid product is withdrawn from the reaction vessel via a liquid product outlet.

14. The process in accordance with claim 13 wherein a baffle device is positioned inside the reactor vessel so as to prevent unreacted slurry from leaving said vessel with the clear liquid product.

15. A process for hydrometallization of a poor quality residual oil feedstock containing asphaltenes which comprises:
   (a) mixing said residual oil feedstock with a catalyst having particle sizes ranging between 20–300 microns, to form a liquid feed/catalyst slurry;
   (b) introducing said slurry into the upper end of a vertically oriented reaction vessel through a fluid inlet;
   (c) removing at least a portion of the slurry from the bottom of said reaction vessel and passing it, at a high velocity, through an external mixing loop in fluid communication with the vessel;
   (d) introducing a hydrogen-containing gas into the external mixing loop to mix with the slurry passing through the loop;
   (e) introducing the resultant hydrogen-containing slurry into the top portion of the reaction vessel so as to mix with the liquid feed/catalyst slurry entering the vessel through the feed inlet;
   (f) passing the resulting mixture downward through the reaction vessel to allow hydrodemetallization of the residual oil to take place thereby producing a clear liquid product; and
   (g) withdrawing said clear liquid product from the reaction vessel.

* * * * *